United States Patent
Downs

[15] 3,669,275
[45] June 13, 1972

[54] APPARATUS FOR REMOVING OIL FROM WATER

[72] Inventor: Ned E. Downs, Raleigh, N.C.
[73] Assignee: Hercules Incorporated, Wilmington, Del.
[22] Filed: Nov. 4, 1970
[21] Appl. No.: 86,782

[52] U.S. Cl. ........................210/242, 210/460, 210/DIG. 21
[51] Int. Cl. ........................................................E02b 15/04
[58] Field of Search....................210/23, 40, 170, 242, 460, 210/DIG. 21

[56] References Cited

UNITED STATES PATENTS

| | | | |
|---|---|---|---|
| 1,768,310 | 6/1930 | Erickson | 210/242 X |
| 2,778,500 | 1/1957 | Fuller | 210/DIG. 21 |
| 2,788,125 | 4/1957 | Webb | 210/242 X |
| 3,556,301 | 1/1971 | Smith | 210/DIG. 21 |

*Primary Examiner*—Samih N. Zaharna
*Attorney*—Edwin H. Dafter, Jr.

[57] ABSTRACT

Improved equipment for removing oil from the surface of a body of water is disclosed. To a previously known apparatus comprised of an oleophilic fibrous batt having one or more perforated pipes embedded in it for taking away adsorbed oil, there is added a flexible shield covering the area where the pipe or pipes are located. The shield prevents water from entering into the area of the pipes and being pumped off with the oil.

3 Claims, 4 Drawing Figures

NED E. DOWNS
INVENTOR

BY William S Alexander

ATTORNEY

NED E. DOWNS
INVENTOR

BY William S Alexander

ATTORNEY

APPARATUS FOR REMOVING OIL FROM WATER

This invention relates to a method of collecting oil from the surface of a body of water while collecting a minimum amount of water with said oil.

In recent years, much attention has been given to the removal of oil and oleophilic contaminants from the surface of large bodies of water such as the oceans and coastal and inland water ways. Of the great variety of techniques which have been proposed for this purpose, the most practical are those which involve collecting the oil on some type of fibrous or foam device from which it can easily be removed by, e.g., squeezing, pumping, or vacuum, following which the collecting member can be returned to the water for re-use. One device, in particular, which is believed to be very practical is shown by Burroughs et al in co-pending U.S. application, Ser. No. 31,472. This device comprises, in essence, a fibrous polyolefin body enclosing one or more perforated pipes which are attached to a pump on board an accompanying boat or barge employed to drag the fibrous body through the contaminated area. The polyolefin exhibits great affinity for oil and is thus able to absorb a substantial quantity of oil which is pumped off through the perforated pipe, or pipes, to an appropriate storage area on board the boat or barge.

The method just described derives its efficacy from the affinity of the olefin polymer, in fibrous form, for the oil. When such a fibrous body is thoroughly wet with oil, it is substantially completely repellent to water. Thus, in an ideal situation where the fibrous body remains completely wet with oil throughout the entire clean-up operation, substantially no water is collected with the oil. Such an ideal condition, however, will usually only exist in very still water. When the water is turbulent, there will frequently be water washing over the fibrous body or otherwise splashing into locations from which it can flow into the perforated pipe and be pumped to storage with the oil.

It is the purpose of this invention to provide apparatus by which water is prevented from entering into the pipes employed for pumping off the oil gathered from the surface of the water, thus insuring the collection of substantially water-free oil even in very turbulent water. In accordance with this invention, it has been determined that a flexible, water impervious shell, installed over the fibrous body in the area of the perforated pipe, or pipes, substantially completely eliminates water from the recovered oil. The invention which accomplishes this purpose, more precisely stated, is an improvement in apparatus for removing oil from the surface of a body of water, said apparatus comprising an oleophilic fibrous body comprised of upper and lower surfaces and forward and aft sections and having at least one elongated perforated pipe within the forward section adapted to remove oil therefrom and the improvement comprising a flexible shell covering the upper and lower surfaces of the forward section of said fibrous body substantially completely while leaving at least the lower surface of the aft section of said fibrous body exposed and free to contact the contaminant.

The invention and the method of employing it are illustrated in the attached drawing in which.

Figure 1:
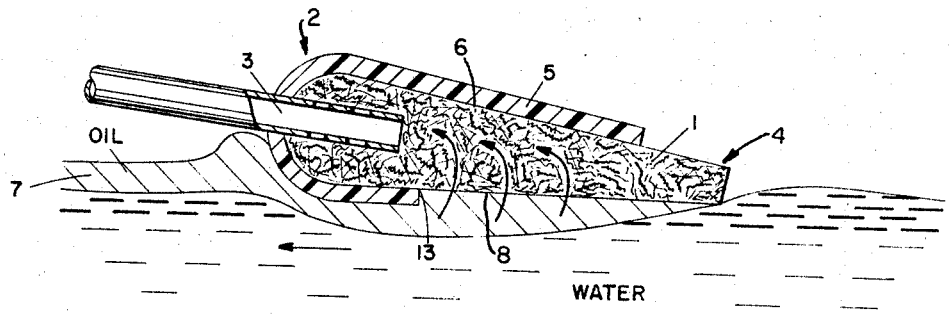
FIG. 1 illustrates a preferred embodiment of the invention.

With reference to FIG. 1 of the drawing the apparatus comprises a fibrous polyolefin body having a forward section 2, an aft section 4, an upper surface 6, and a lower surface 8. One or a plurality of perforated pipes 3 are embedded in the forward section of the fibrous body. The fibrous body has the periphery of its forward section enclosed within a water-impervious flexible shell 5, adapted to enclose the area of the body housing the perforated pipe or pipes 3. A substantial portion of the fibrous body, especially including the lower surface of the aft section, is outside the shell, and in position to contact the oil on the surface of the water.

Figure 2:
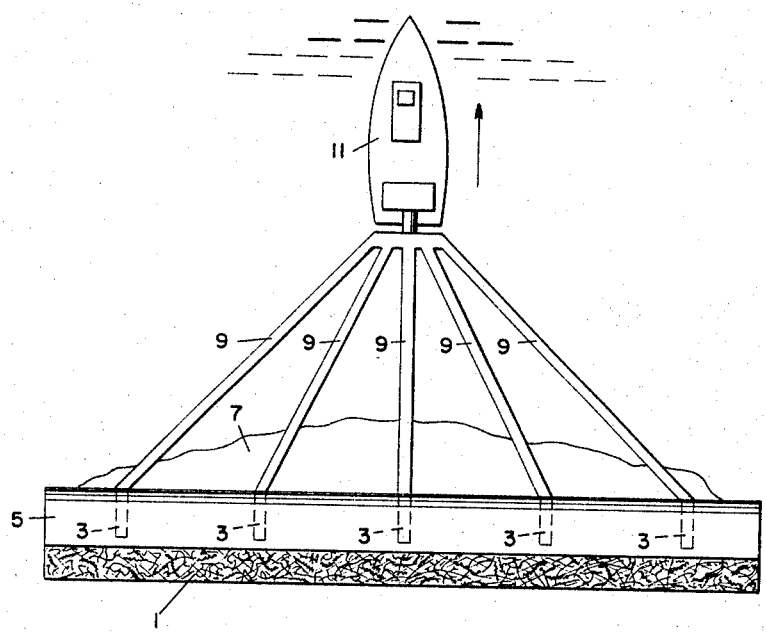
FIG. 2 illustrates the manner in which the FIG. 1 embodiment is employed.

In removing oil from the surface of a body of water using this embodiment of the invention as shown in FIG. 2, the shell-encased fibrous body 1 rests on the water in the oil slick 7. The pump-off pipes or fittings 3 are connected to pumping lines 9 which in turn are connected to a pump or a vacuum source on boat 11. The fibrous body is drawn through the water, referring again to FIG. 1, in the direction of the arrow. The impervious flexible shell 5 completely enclosed the forward section of the fibrous body so that the nearest point at which liquid (oil and/or water) contacts the fibrous body is the point 13 which is spaced apart from the pump-off fittings in the aft section of the body. When the body is in contact with a layer of oil on the water surface as shown, the oleophilic fibers attract the oil and the oil is propelled by capillary action and by the pumping force on the pump-off pipes through the body to the pipes and thence to the boat. As depicted, the trailing end of the apparatus rests in the water, depicting a complete removal of the oil from the water. In such a case, the water which contacts the trailing edge of the body cannot travel to the forward section so long as the remainder of the body is wet with oil.

In the normal course of operation, there will be occasions when the fibrous body will be in contact with water along its entire length or substantially along its entire length. This can happen particularly in turbulent water where waves cause the surface of the water to break, and water momentarily displaces all of the oil in spots throughout the area being contacted. It can also happen in places where the oil layer is relatively thin and all available oil is removed quickly as, e.g., might happen near the edge of the contaminated area. It can also happen, in rough water, that water will wash over the fibrous body and douse it. In any of these cases, water can be entrained with the oil if provision is not made to prevent this from happening.

When using the apparatus of this invention, the point where oil is taken off from the fibrous body is shielded from contact with water by the flexible shell 5 as shown in FIG. 1. Due to the affinity of the oleophilic fiber for the oil, the oil is absorbed and can flow by capillary action to the pump-off fittings even though this involves a reversal of the flow direction as shown by the curved directional arrows. No such affinity exists for water and thus capillary flow of the water is substantially non-existent. Moreover, if water does get into the fibrous body it can be expelled therefrom and displaced by oil while it still is well away from the pump-off point and not under the influence of the pumping force.

The oleophilic fiber is preferably a polyolefin such as polyethylene, polypropylene or any of the fiber-forming olefin polymers known to the textile art for use as fibers and filaments. The most commonly used and most preferred are those based on propylene, referred to generically as polypropylene.

The fiber can be used in the form of a non-woven batt of either staple fiber or tow which can be needle punched or sewn to afford the necessary structural integrity. Alternatively, the batt can be prepared from a plurality of, e.g., woven or tufted layers laid up and secured together into an integral structure suited for skimming the water surface. The individual fibers can be of any size up to about 70 denier per filament, preferably about 10 denier or less including microfibers of less than 1 denier.

It is found that the volume of oil picked up and the magnitude of the capillary force acting on the oil are inversely related to the denier of the fiber, i.e., the smaller the fiber denier, the greater the absorption capacity. Fibers of 1 to 70 denier can pick up as much as 1,800 percent of their own weight of oil. Fibers of less than 1 denier have been found to pick up as much as 4,000 percent of their weight. The fibers can be crimped or smooth, although crimped fibers are preferred due to their greater structural coherence.

Figure 3:
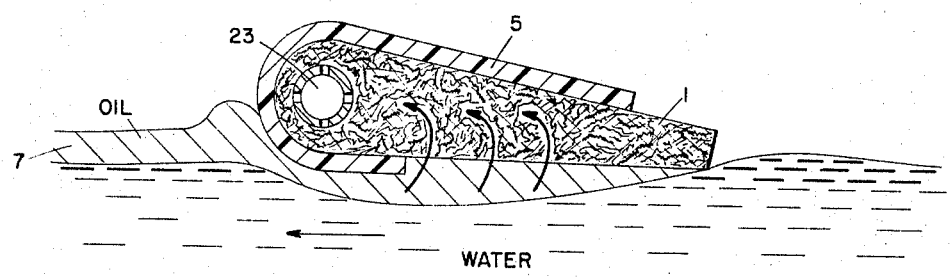
FIG. 3 illustrates another embodiment of the invention.
Figure 4:
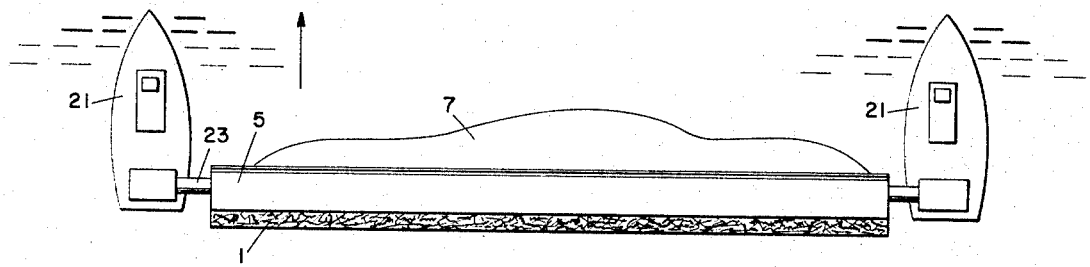
FIG. 4 illustrates the manner in which the FIG. 3 embodiment is employed.

As shown in FIG. 3 and 4 of the drawing, the fibrous body 1 can be adapted to be suspended between two barges 21 on which the oil will be collected. In this case the pump-off means is an elongated, flexible, perforated pipe 23. A plastic pipe such as a polyethylene or polypropylene pipe is useful for this purpose. Both of these materials have the desirable low specific gravity, i.e., lower than that of water. Other materials of low specific gravity having the required flexibility, such as rubber, can also be used. To increase the flexibility of the pipe while improving its resistance to collapse under the influence of the pumping force employed to remove the oil, the pipe can have a corrugated surface configuration.

The preferred pumping force for removing absorbed oil from the fibrous body is vacuum. This can be provided by any means known to the practitioner. More conventional pumping means such as, e.g., centrifugal pumps, can also be employed, if more convenient.

The barrier or shell employed to shield the pump-off point of the device can be substantially any material which is sufficiently flexible to ride with the surface when the water is rough and which is inert to water and to the contaminating oil, while being sturdy enough to withstand the physical stresses encountered in rough water. The material is preferably a plastic material such as a polyethylene or polypropylene sheet. Here again, the low specific gravity of these materials is helpful in assuring that the overall specific gravity of the apparatus is sufficiently low that it floats on the water.

The device is described above in an embodiment suitable for use on large bodies of water such as the ocean where it is drawn over the surface to create relative motion between the device and the oil/water interface. It can also be adapted for a stationary installation in running water as, e.g., on a river. In this embodiment, the ends of the device are secured on the banks of the river and the water/oil surface is permitted to pass beneath it. Oil collected from the surface is removed to storage by pumps located on the banks of the river.

In the stationary operation described above, the apparatus is helpful in areas where the pollution is intermittent but the potential for pollution exists continuously as, e.g., at the effluent stream of a refinery. Due to the omnipresent danger of pollution occurring, it is desirable to have the apparatus permanently installed. The impervious barrier described hereinabove prevents the device from becoming saturated with water during periods when no oil is present on the river surface.

What I claim and desire to protect by Letters Patent is:

1. In apparatus for removing oil from the surface of a body of water including an oleophilic fibrous web comprised of an upper and lower surface and forward and aft sections and having at least one perforated pipe within the forward section, said pipe being adapted to remove oil from said fibrous web and communicating with an oil storage facility, the improvement which comprises a water impervious flexible shell covering the upper and lower surfaces of the forward section of the web thereby enclosing the area of the body housing the perforated pipe.

2. The apparatus of claim 1 where the flexible shell is a sheet of a polyolefin film.

3. The apparatus of claim 2 where the oleophilic fibrous web is a polyolefin.

* * * * *